United States Patent
Hosokawa (10) Patent No.: US 8,054,484 B2
(45) Date of Patent: Nov. 8, 2011

(54) IMAGE FORMING DEVICE

(75) Inventor: Takahiro Hosokawa, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 661 days.

(21) Appl. No.: 12/167,700

(22) Filed: Jul. 3, 2008

(65) Prior Publication Data

US 2009/0009790 A1    Jan. 8, 2009

(30) Foreign Application Priority Data

Jul. 6, 2007 (JP) .................................. 2007-178588

(51) Int. Cl.
*G06K 15/00* (2006.01)
*B41J 29/38* (2006.01)
*B41J 29/46* (2006.01)
*G03G 21/00* (2006.01)

(52) U.S. Cl. .................... 358/1.14; 358/1.15; 358/3.28; 399/389; 399/390; 340/572.1

(58) Field of Classification Search ................. 358/1.14, 358/1.15, 3.28; 340/572.1
See application file for complete search history.

(56) References Cited

U.S. PATENT DOCUMENTS

| | | | |
|---|---|---|---|
| 7,466,957 B2 * | 12/2008 | Muto | 399/389 |
| 2007/0274753 A1 | 11/2007 | Muto | |

FOREIGN PATENT DOCUMENTS

| | | | |
|---|---|---|---|
| JP | 2001-96814 | | 4/2001 |
| JP | 2005215621 A | | 8/2005 |
| JP | 2006-088478 A | * | 4/2006 |
| JP | 2006088478 A | | 4/2006 |
| JP | 2006110802 A | | 4/2006 |
| JP | 2006-272842 | | 10/2006 |
| JP | 2006-327067 | | 12/2006 |
| JP | 2007-076066 A | | 3/2007 |
| JP | 2007-076066 A | * | 3/2007 |

OTHER PUBLICATIONS

Notice of Reasons of Rejection for Japanese Patent application No. 2007-178588, dispatched on Jun. 16, 2009.
JP Office Action dtd Sep. 1, 2009, JP Appin. 2007-178588, English translation.

* cited by examiner

*Primary Examiner* — Charlotte M Baker
*Assistant Examiner* — Aaron R Gerger
(74) *Attorney, Agent, or Firm* — Banner & Witcoff, Ltd (57) ABSTRACT

There is provided an image forming device, comprising: a print unit configured to form an image on a recording medium in which a memory device is embedded; a detection unit configured to detect a condition of the memory device embedded in the recording medium, the detection unit being positioned on a downstream side in a feeding direction with respect to the print unit; and a notification control unit configured to provide notification concerning the condition of the memory device, in response to a fact that the detection unit detects that the memory device embedded in the recording medium is defective.

10 Claims, 5 Drawing Sheets

IMAGE FORMING DEVICE

CROSS-REFERENCE TO RELATED APPLICATION

This application claims priority under 35 U.S.C. §119 from Japanese Patent Application No. 2007-178588, filed on Jul. 6, 2007. The entire subject matter of the application is incorporated herein by reference.

BACKGROUND

1. Technical Field

Aspects of the present invention relate to an image forming device forming an image on a recording medium in which a memory device, such as an IC tag, is embedded.

2. Related Art

Recently, recording sheets in which IC tags are embedded have become widespread. Such an IC tag embedded in a recording sheet is able to store various types of information (e.g., image data). Hereafter, a recording sheet in which an IC tag is embedded is frequently referred to as an IC tag sheet. Image forming devices having a function of reading information from and writing information to an IC tag embedded in a recording sheet have also become widespread.

Since an IC tag is sensitive to static electricity and a mechanical force, an image forming device capable of examining whether the IC tag is good or bad has been proposed. Japanese Patent Provisional Publication No. 2006-327067 (hereafter, referred to as JP2006-327067A) discloses an image forming device configured to have a read/write device for reading information from and writing information to an IC tag embedded in a recording medium. More specifically, in the image forming device disclosed in JP2006-327067A, the read/write device is positioned on an upstream side of a transfer position at which an image is transferred to the recording sheet. When an IC tag is judged to be defective, the image forming device forms a particular image indicating that an IC tag is defective on a recording sheet and reedits image data.

SUMMARY

However, the above described image forming device has a drawback described below. That is, there is a possibility that an IC tag embedded in a recording sheet is damaged by an electrical shock during a transferring process because the IC tag is subjected to electromagnetic waves in the print unit of the image forming device during the transferring process, and an IC tag is sensitive to a high temperature heat process as well as an electrical shock.

In the image forming device disclosed in JP2006-327067A, the judgment on whether the IC tag is defective or not is performed at the stage before transferring of a toner image to a recording sheet. Therefore, the image forming device is not able to take measures against an IC tag damaged when passing through the print unit, although the image forming device is able to take measures against an IC tag which is judged to be defective at the stage immediately after a recording sheet is fed from a sheet supply unit.

Aspects of the present invention are advantageous in that an image forming device capable of precisely detecting a recording sheet having a defective IC tag is provided.

According to an aspect of the invention, there is provided an image forming device, comprising: a print unit configured to form an image on a recording medium in which a memory device is embedded; a detection unit configured to detect a condition of the memory device embedded in the recording medium, the detection unit being positioned on a downstream side in a feeding direction with respect to the print unit; and a notification control unit configured to provide notification concerning the condition of the memory device, in response to a fact that the detection unit detects that the memory device embedded in the recording medium is defective.

Such a configuration makes it possible to increase the accuracy in detecting a defective condition of an IC tag embedded in a recording sheet.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

DETAILED DESCRIPTION

Hereafter, an embodiment according to the invention will be described with reference to the accompanying drawings.

Figure 1:
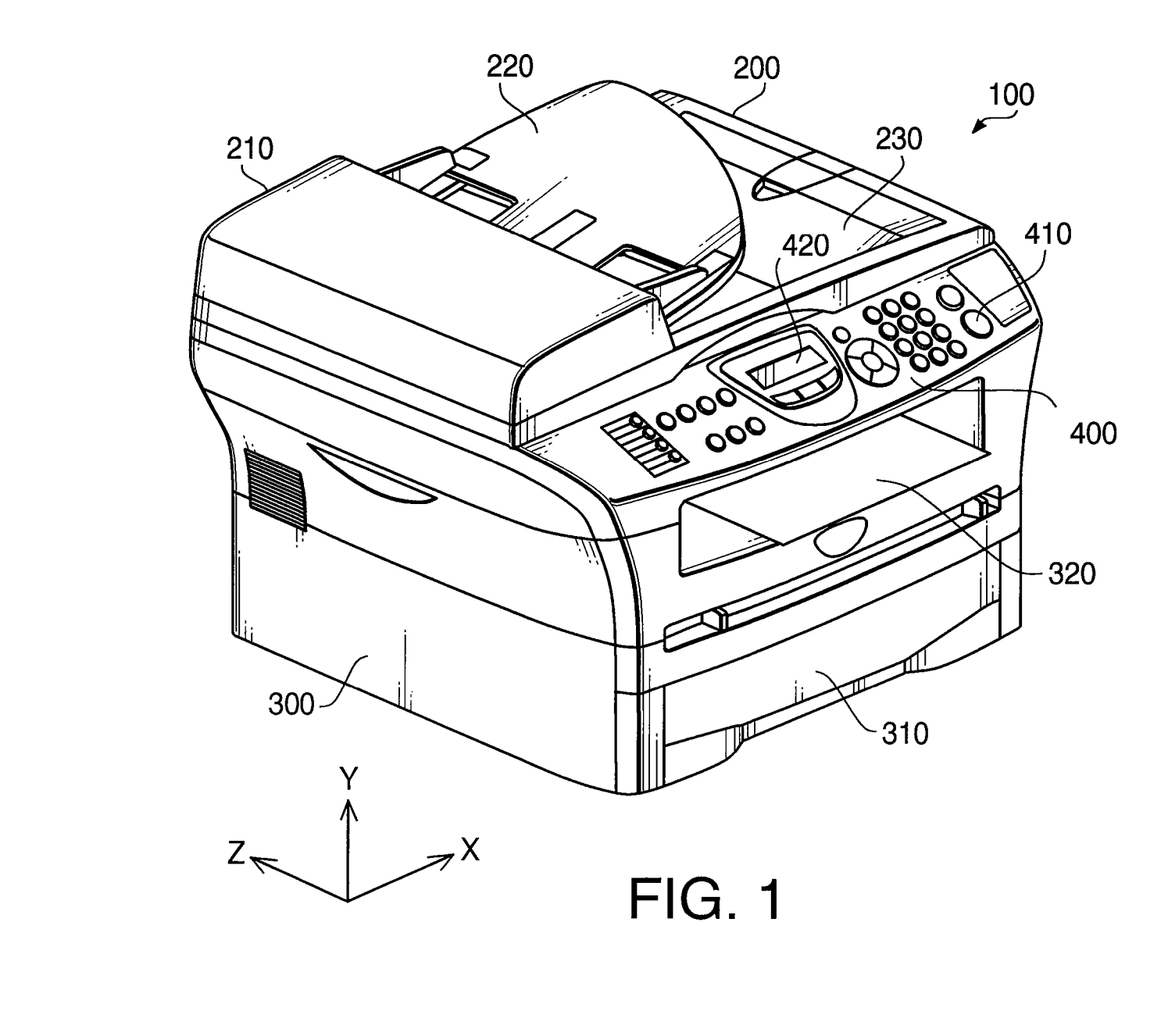
FIG. 1 is a perspective view of a copying device according to an embodiment.

FIG. 1 is a perspective view of a copying device 100 according to an embodiment. As shown in FIG. 1, the copying device 100 includes an image reading unit 200 having a function of reading a document, an image formation unit 300 having a function of forming, on a recording sheet, an image corresponding to image data read by the image reading unit 200, and an operation unit 400 used to operate the copying device 100.

The image reading unit 200 includes an ADF (Automatic Document Feeder) 210, a sheet supply tray 220 in which a document to be read is placed, and a paper output tray 230 to which a document which has been subjected to a reading operation is ejected. The paper output tray 230 is attached to a main body of the copying device 100 to be openable and closable with respect to the main body about a supporting shaft which is provided at a rear side of the main body to be elongated in an X-direction. In this configuration, the ADF 210 and the sheet supply tray 220 move in the vertical direction with the movement of the paper output tray 230. That is, when the paper output tray 230 is opened or closed in the vertical direction with respect to the main body, the ADF 210 and the sheet supply tray 220 move in the vertical direction.

Under the paper output tray 230, a glass plate (not shown) on which a document to be read is placed is provided. The glass plate is exposed when the paper output tray 230 is opened with respect to the main body of the copying device 100. At a position immediately under the glass place, a CCD sensor is provided to be slidable in the X direction (see FIG. 1).

That is, the copying device 100 supports two reading manners: a first manner in which a document to be read is placed on the glass plate; and a second manner in which a document is read through the ADF. When the first manner is used, the CCD sensor moves along the glass place in the X direction while reading a document on a line by line basis. When the second manner is used, the CCD sensor is fixed at a left edge position under the glass place, and the reading operation is conducted for a document being carried by the ADF 210.

The image formation unit 300 includes a sheet supply cassette 310 which is detachably attachable to the main body of the copying device 100 from the front side, and a paper output tray 320 to which sheets of paper on which images have been formed are stacked. A user is able to place various types of recording sheets including plain paper and an IC tag recording sheet, on the sheet supply cassette 310. In the following, it is assumed that IC tag recording sheets are placed on the sheet supply cassette 310.

Figure 2:
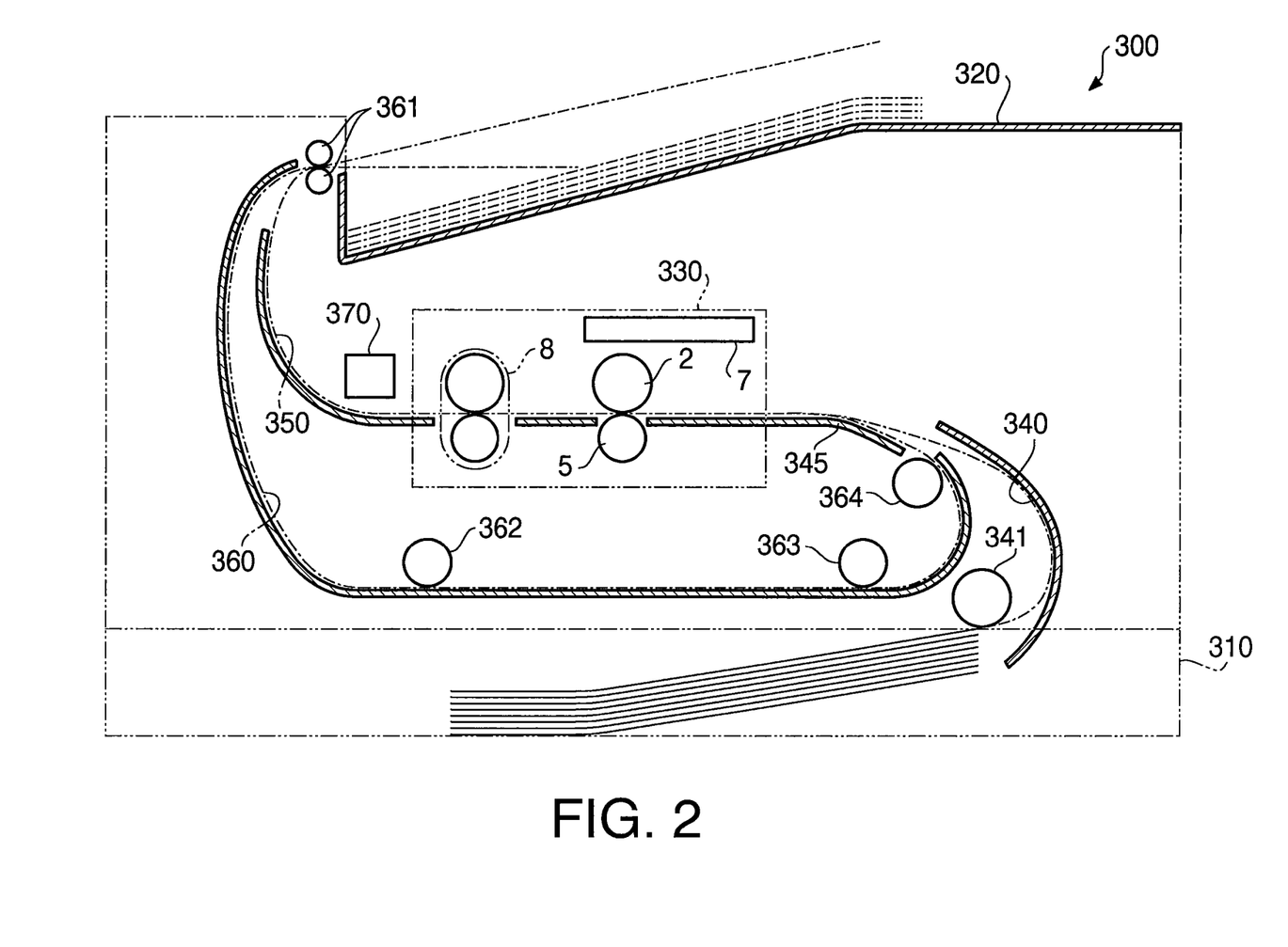
FIG. 2 is a schematic diagram illustrating an internal structure of an image formation unit of the copying device.

FIG. 2 is a schematic diagram illustrating an internal structure of the image formation unit 300 of the copying device 100. As shown in FIG. 2, the image formation unit 300 includes a print unit 330 configured to form a toner image through an electrophotographic process, a sheet supply roller 341 which supplies a sheet of paper (an IC tag recording sheet) placed in the sheet supply cassette 310 toward the print unit 330, ejection rollers 361 which eject the sheet of paper to the paper output tray 320, and an R/W (read/write) unit 370 configured to read information from and write information to an IC tag embedded in an IC tag recording sheet.

Figure 3:
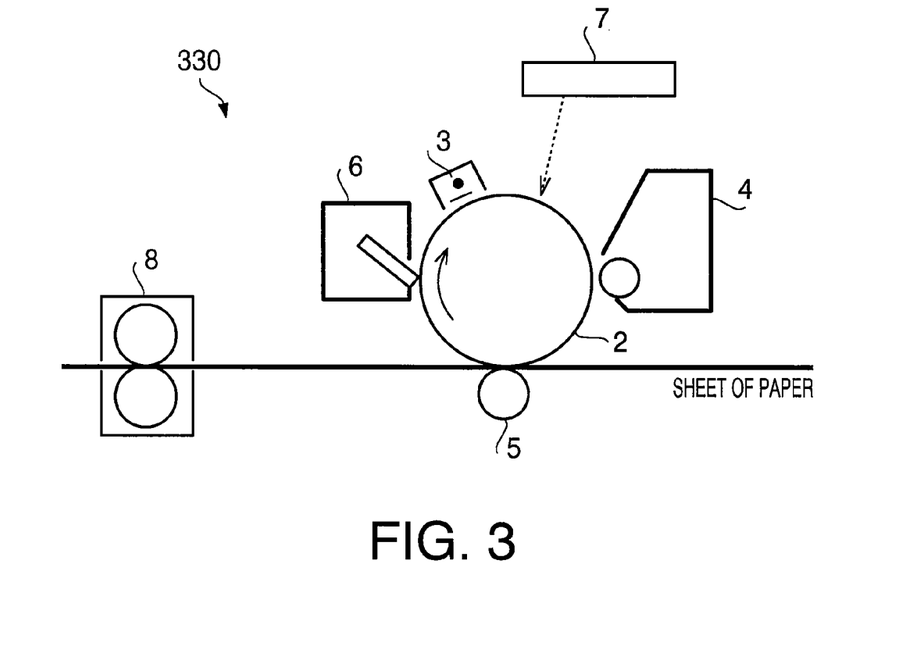
FIG. 3 is a schematic diagram illustrating an internal structure of a print unit in the copying device.

FIG. 3 is a schematic diagram illustrating an internal structure of the print unit 330. The print unit 330 includes a laser emission device 7, a photosensitive drum 2, a transfer unit 5 having a form of a roller, and a fixing unit 8. Further, in the print unit 330, a charge unit 3, a developing unit 4 and a cleaning unit 6 are provided to surround the photosensitive drum 2. A laser beam emitted by the laser emission device 7 impinges on the photosensitive drum 3 at a position which is on the downstream side of the charge unit 3 and on the upstream side of the developing unit 4. The fixing unit 8 is located on a downstream side of the transfer unit 5 along a sheet feeding path.

The laser emission device 7 emits the laser beam based on image data to scan the outer circumferential surface of the photosensitive drum 2 with the laser beam. The image data is created based on an image read by the image reading unit 200. Alternatively, the image data may be transmitted from an external device to the copying device 100 if the copying device 100 is used as a printer.

The photosensitive drum 2 rotates in a state where the outer circumferential surface of the photosensitive drum 2 is electrically charged uniformly by the charge unit 3. On the outer circumferential surface of the photosensitive drum 2, potentials of portions illuminated by the laser beam from the laser emission unit 7 are changed. Therefore, on the outer circumferential surface of the photosensitive drum 2, a latent image is formed by the differences in potential between illuminated portions and not illuminated portions.

Then, toner is supplied from the developing unit 4 to the outer circumferential surface of the photosensitive drum 2 to develop a toner image on the outer circumferential surface of the photosensitive drum 2. The toner image is then attracted electrically by the transfer unit 5 placed to face the photosensitive drum 2, and is transferred to the sheet of paper (an IC tag sheet) passing along the sheet feed path between the photosensitive drum 2 and the transfer unit 5. The toner remaining on the outer circumferential surface of the photosensitive drum 2 after the image is transferred to the sheet of paper is recaptured mechanically or electrically by the cleaning unit 6 so that the outer circumferential surface of the photosensitive drum 2 is cleaned. The fixing unit 8 applies heat and pressure to the sheet of paper on which the image has been transferred so that the image is fixed.

As shown in FIG. 2, the R/W unit 370 is positioned on the downstream side with respect to the print unit 330. The image formation unit 300 detects whether the IC tag embedded in the IC tag sheet is defective based on information read by the R/W unit 370 from the IC tag.

In the image formation unit 300, the sheet feed path having a shape of a letter "S" is formed so as to guide the sheet of paper sent out from the sheet supply cassette 310 toward paper output tray 320. As shown in FIG. 2, the "S"-shaped sheet feed path includes a feeding path 340 having a form of a half-arc to turn the sheet feed path toward the rear side of the image formation unit 300 in a form of a horizontally-oriented letter "U", a feeding path 345 to guide the sheet of paper fed along the feeding path 340 toward the print unit 330, and a feeding path 350 to further guide the sheet of paper on which an image has been formed at the print unit 330 to turn the sheet of paper in a form of a horizontally oriented letter "U" toward the paper output tray 320.

Further, the image formation unit 300 includes a both-side print mechanism for printing images on both sides of a sheet of paper in a both-side print mode. In FIG. 2, a feeding path 360 serves to guide the sheet of paper having a front side on which an image has been formed, toward the print unit 330 while reversing the sheet of paper so that an image can be formed on a rear side of the sheet of paper in the print unit 330. More specifically, the feeding path 360 is situated outside the feeding path 350 to feed the sheet of paper downwardly and further to guide the sheet of paper toward the feeding path 345 from a space formed between the print unit 330 and the paper feed cassette 310.

In the both-side print mechanism, the sheet of paper whose one side has been subjected to the printing operation is conveyed toward the paper output ray 320. At this time, the sheet of paper is conveyed until a rear edge of the sheet of paper leaves the feeding path 350, and then the sheet of paper is conveyed in a reverse direction by rotating the ejection rollers 361 in an inverse direction. That is, in this case, the rear edge of sheet of paper defined in the upper side feeding path (including the feeding paths 340, 345 and 350) is switched to the front edge of the sheet of paper. Then, the sheet of paper is fed to the feeding path 360. At the stage where the sheet of paper reaches the feeding path 345 through feed rollers 362, 363 and 364, the sheet of paper has been reversed.

The operation unit 400 serves as an input/output device. The operation unit 400 includes various types of switches and buttons to be used by a user (see FIG. 1). More specifically, the operation unit 400 includes a "Copy" button 410 used to instruct the copying device 100 to start the copying operation. Further, the operation unit 400 includes a display panel 420 on which various types of information including an error message is displayed.

Figure 4:
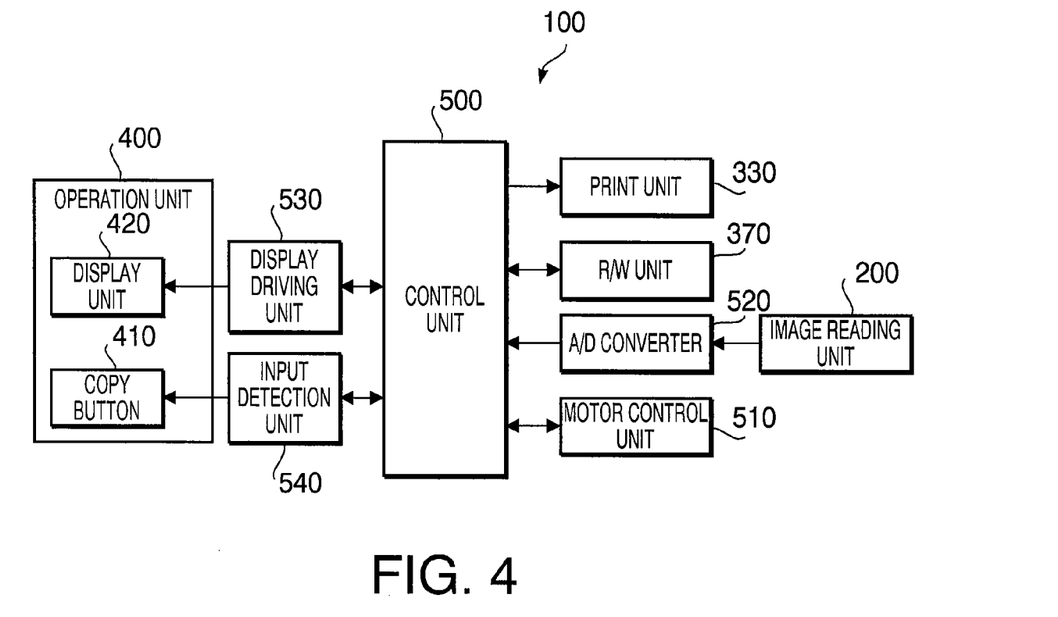
FIG. 4 illustrates a block diagram of a control system of the copying device.

Hereafter, a control system of the copying device 100 is explained. FIG. 4 illustrates a block diagram of the control system of the copying device 100. As shown in FIG. 4, the coping device 100 includes a control unit 500, a motor control unit 510, an A-D converter 520, a display driving unit 530, an input detection unit 540, the print unit 330, and the R/W unit 370. These units 510, 520, 530, 540, 330 and 370 are connected to the control unit 500.

The control unit 500 has the function of controlling the functions of the copying device 100. That is, the control unit 500 executes various programs to achieve the functions of the copying device 100. The motor control unit 510 controls various types of motors for driving various rollers in the image reading unit 200 and the image formation unit 300. The A-D converter 520 digitizes an image read by the image reading unit 200 to create image data corresponding to the read image.

The display driving unit 530 controls the display unit 420 to display various types of information on the display unit 420. The input detection unit 540 detects an input through the "Copy" button 410 provided on the operation unit 400. To the input detection unit 540, other buttons of the operation unit 400 are also connected.

Figure 5:
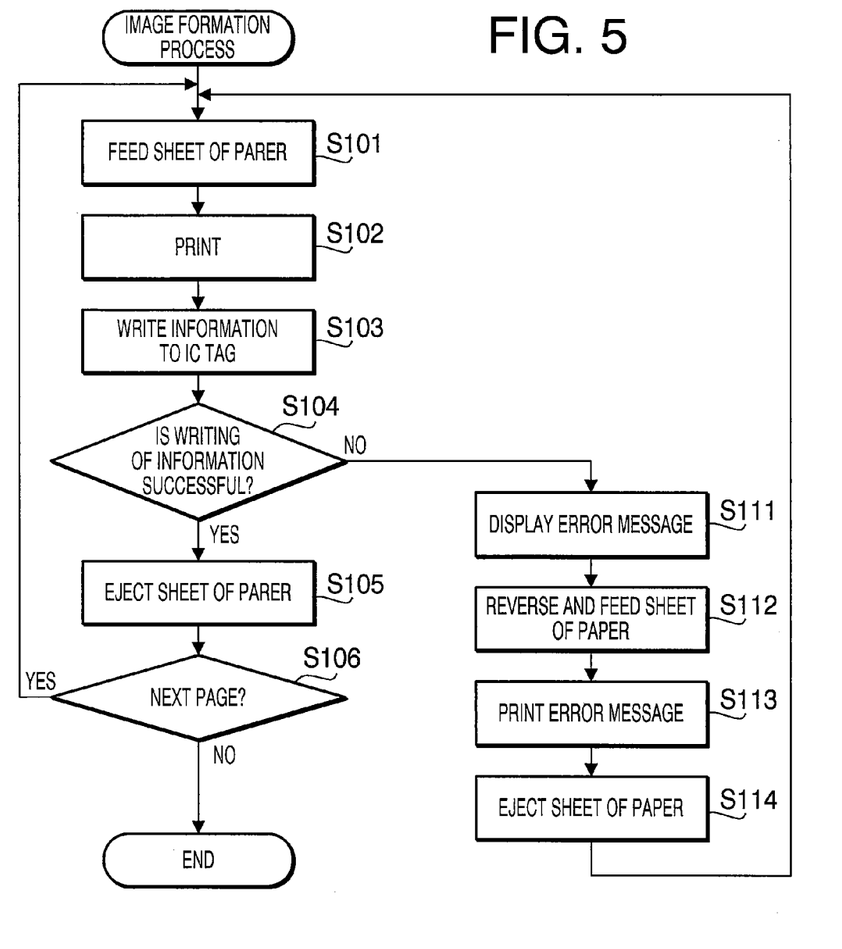
FIG. 5 is a flowchart illustrating an image formation process executed by the copying device.

Hereafter, an operation of the image formation unit 300 is explained with reference to FIG. 5. FIG. 5 is a flowchart illustrating an image formation process executed under control of the control unit 500. First, an IC tag sheet is sent out from the sheet supply cassette 310 by the sheet supply roller 341 so that the IC tag sheet is conveyed to the print unit 330 (step S101). Then, an image is formed on the IC tag sheet in the print unit 330 (step S102). More specifically, in step S102, a toner image is formed on the photosensitive drum 2, and the toner image is transferred to the IC tag sheet while the IC tag sheet passes a position between the photosensitive drum 2 and the transfer unit 5. After the toner image is transferred to the IC tag sheet, the pressure and heat are applied to the IC tag sheet by the fixing unit 8 so that the toner image on the IC tag sheet is fixed.

Next, the R/W unit 370 writes information to the IC tag embedded in the IC tag sheet (step S103). For example, information concerning the date and time when an image is formed, information concerning image data corresponding to the formed image, information concerning a page number of the printed image in a print job, and user information concerning a user who executed the printing operation are written to the IC tag.

After such information is written to the IC tag, the control unit 500 judges whether the writing of the information is successfully finished (step S104). For example, in step S104, the control unit 500 reads information from the IC tag, and compares the information read from the IC tag with the information which the control unit 500 has written to the IC tag. If the information read from the IC tag does not match the information which the control unit 500 has written to the IC tag, the control unit 500 judges that the IC tag is defective. The control unit 500 also judges that the IC tag is defective if no information can be obtained from the IC tag.

If the writing of the information to the IC tag is successful (S104: YES), the control unit 500 ejects the IC tag sheet to the paper output tray 320 (step S105). Then, the control unit 500 judges whether data of a next page to be printed remains (step S106). If data of a next page to be printed remains (S106: YES), control returns to step S101 to start feeding of a next sheet of paper. If no data to be printed next remains (S106: NO), the image formation process terminates.

If the writing of the information to the IC tag is unsuccessful (S104: NO), the control unit 500 informs the user of failure of writing of the information as explained below. First, the control unit 500 displays information indicating that the IC tag is defective, on the display panel 420 of the operation unit 400 (step S111). For example, an error message is displayed on the display panel 420. A detailed error message indicating details of the error may be displayed additionally on the display panel 420. For example, information concerning the user who instructed the print job, the page number of the image to be printed on the IC tag sheet of which IC tag is judged to be defective may be displayed on the display panel 420 so that the user can immediately identify the IC tag sheet of which IC tag has been judged to be defective.

Next, the control unit 500 feeds the IC tag sheet in a reverse direction by using the feeding path 360 provided for the both-side reading mechanism (step S112). That is, the control unit 500 controls the feeding of the IC tag sheet so as not to eject the IC tag sheet, and then conveys the IC tag sheet along the feeding path 360 in the state where a side of the IC tag sheet (i.e., a rear side of the IC tag sheet) on which an image is not formed yet faces the photosensitive drum 2 in the print unit 330.

Figure 6:
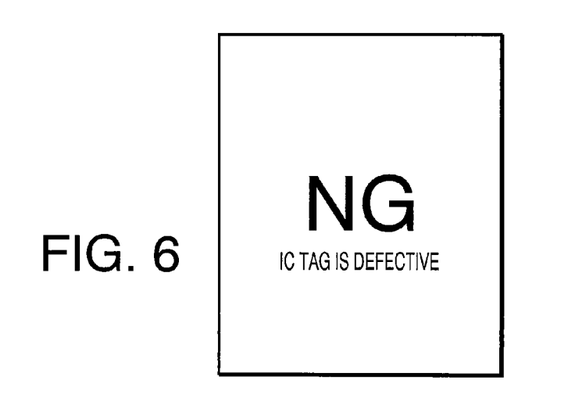
FIG. 6 illustrates an example of an error message printed on a rear side of an IC tag sheet.

Then, the control unit 500 prints a predetermined error message on the rear side of the IC tag sheet (step S113). FIG. 6 illustrates an example of an error message printed on the rear side of the IC tag sheet. In the example shown in FIG. 6, a mark "NG" is printed on the central portion of the rear side of the IC tag sheet, and detailed information concerning the error is printed under the mark "NG". After the error message is transferred on the rear side of the IC tag sheet, the error message is fixed on the rear side of the IC tag sheet by the fixing unit 8, and then the IC tag sheet is ejected to the paper output tray 320 (step S114).

It is noted that since the error message is printed on the rear side of the IC tag sheet having the defective IC tag after the IC tag sheet having the defective IC tag is reversed through the feeding path 360, the IC tag having the defective IC tag is placed on the paper output tray 320 such that the front side on which the image is printed faces upwardly. Such a configuration enables the user to easily discriminate the IC tag sheet having the defective IC tag from the other normal IC tag sheets. That is, the user is able to easily pick up the IC tag sheet having the defective IC tag.

After the IC tag sheet having the defective IC tag is ejected, control returns to step S101. That is, after the IC tag sheet having the defective IC tag is ejected, the same image which has been formed on the IC tag sheet having the defective IC tag is printed on a next IC tag sheet, and the information which the control unit 500 tried to write to the defective IC tag is written to an IC tag of the next IC tag sheet (steps S101 to S103).

The above described image formation process can also be applied to the both-side print process. More specifically, the both-side print process is executed as follows. When a defective condition of an IC tag of an IC tag sheet is detected during printing on a front side of the IC tag sheet, an error message is printed on a rear side of the defective IC tag sheet. On the other hand, when a defective condition of the IC tag of the IC tag sheet is detected during printing on a rear side of the IC tag sheet, the IC tag sheet is reversed again through the feeding path 360 and the error message is printed on the front side of the IC tag sheet such that the error message is overlaid on the image printed on the front side of the IC tag sheet.

Hereafter, a variation of the image formation process show in FIG. 5 is explained with reference to FIG. 7. The image formation process shown in FIG. 7 can be applied to an image formation device not having a both-side print function. In the following, FIGS. 1 to 4 are referred to for explanations of the image formation process shown in FIG. 7.

Figure 7:
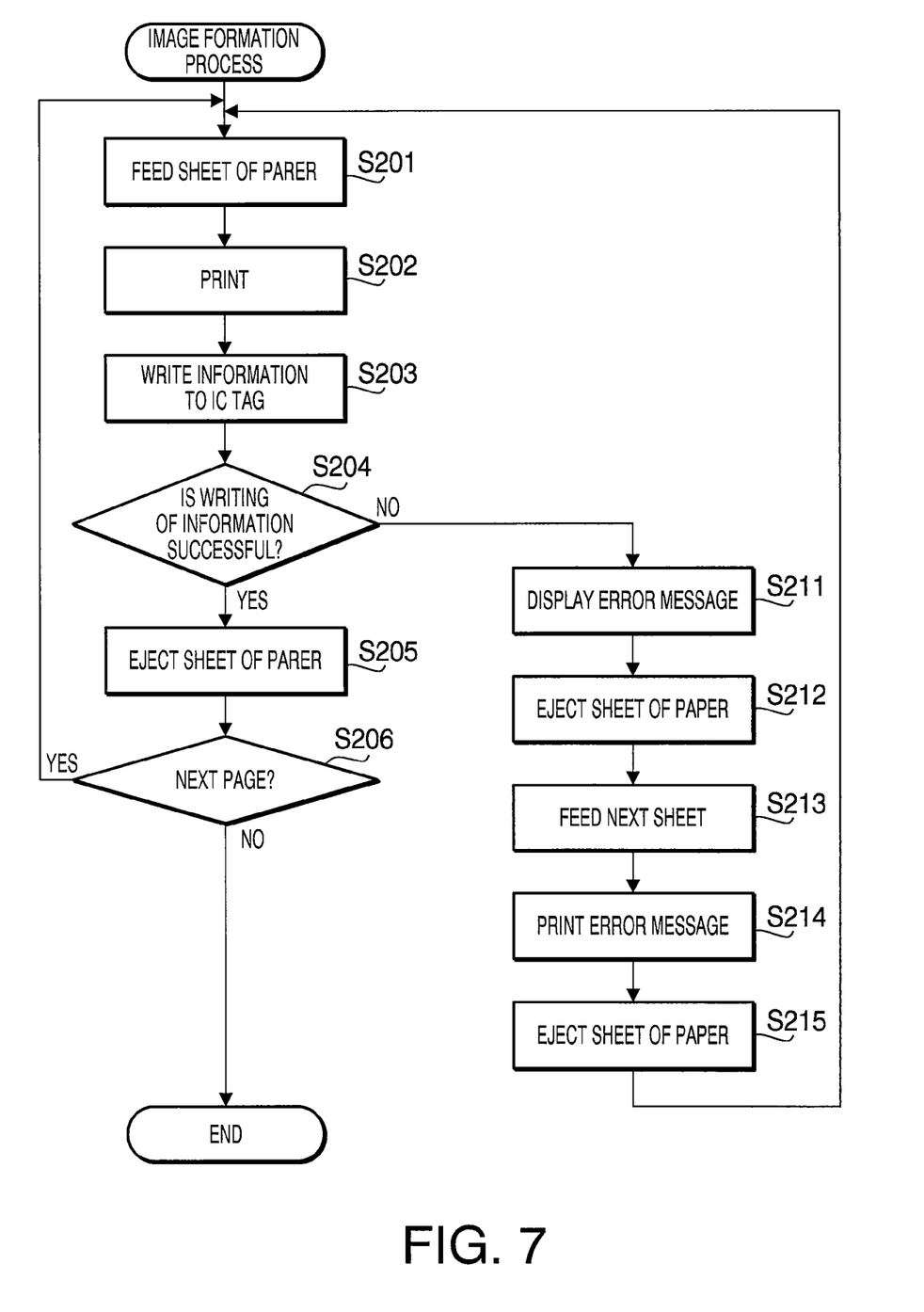
FIG. 7 is a flowchart of an image formation process configured as a variation of the image formation process shown in FIG. 5.

As shown in FIG. 7, first, an IC tag sheet is conveyed from the paper feed cassette 310 to the print unit 330 (step S201). Next, an image is formed on the IC tag sheet in the print unit 330 (step S202). Next, the control unit 500 controls the R/W unit 370 to write information to an IC tag of the IC tag sheet (step S203).

After the information is written to the IC tag of the IC tag sheet, the control unit 500 judges whether the writing of the information to the IC tag is successfully finished (step S204). If the writing of the information to the IC tag is successful (S204: YES), the control unit 500 ejects the IC tag sheet to the paper output tray 320 (step S205). Then, the control unit 500 judges whether data of a next page to be printed remains (step S206). If data of a next page to be printed remains (S206: YES), control returns to step S101 to start feeding of a next sheet of paper. If no data to be printed next remains (S206: NO), the image formation process terminates.

If the writing of the information to the IC tag is unsuccessful (S204: NO), the control unit 500 informs the user of failure of writing of the information as explained below. First, the control unit 500 displays information indicating that the IC tag is defective, on the display panel 420 of the operation unit 400 (step S211). Then, the control unit 500 feeds a next IC tag sheet from the paper feed cassette 310 (step S213). Then, the control unit 500 prints an error message on the next IC tag sheet (step S214). For example, the error message shown in FIG. 6 may be printed on the next IC tag sheet in step S214. After the error message is transferred to the next IC tag sheet, the next IC tag sheet is ejected to the paper output tray 320 through the fixing unit 8 (step S215).

After the IC tag sheet on which the error message is printed is ejected, control returns to step S201. That is, after the IC tag sheet on which the error message is printed is ejected, the control unit 500 prints the same image which has been printed on the IC tag sheet having the defective IC tag, on a further next IC tag sheet, and writes the same information which the control unit 500 tried to write to the defective IC tag, to an IC tag of the further next IC tag sheet (step S201 to S203).

As described above, the R/W unit 370 which is able to detect a defective condition of an IC tag is positioned on the downstream side of the print unit 330. Therefore, the judgment as to whether an IC tag is defective or not can be performed for an IC tag sheet for which formation of the image is finished. Such a configuration makes it possible to detect a defective condition of an IC tag caused during the image formation process in the copying device 100. Therefore, according to the embodiment, it is possible to increase the accuracy in detecting defective conditions of IC tags of IC tag sheets.

It should be noted that regarding a copying device using an electrophotographic process, heat and electric shock are applied to an IC tag of an IC tag sheet. Therefore, according to the embodiment, the accuracy in detecting defective conditions of IC tags of IC tag sheets can be increased particularly for a copying device using an electrophotographic process.

In the image formation process shown in FIG. 5, when a defective condition of an IC tag of an IC tag sheet is detected, the IC tag sheet is reversed and the predetermined error message is printed on the rear side of the IC tag sheet so as to inform the user of the defective condition of the IC tag sheet. Since the information concerning the defective condition is directly printed on the IC tag sheet having the defective IC tag, the user is able to easily identify the IC tag sheet having the defective IC tag. Such a configuration also enables the user to identify the IC tag sheet having the defective IC tag even after a lapse of a relatively long time or after the user brings the printed material (printed IC tag sheets) to the user's home. Since the error message is directly printed on the IC tag sheet having the defective IC tag, it is possible to prevent an IC tag sheet from being used wastefully for informing the user of the defective condition of the IC tag sheet.

In the image formation process shown in FIG. 7, the error message is printed on a next IC tag sheet with respect to an IC tag sheet having the defective IC tag. Such a configuration also makes it possible to enable the user to easily identify the IC tag sheet having the defective IC tag sheet. It should be noted that the image formation process shown in FIG. 7 can be applied to a copying device not having the both-side print function. In other words, the image formation process shown in FIG. 7 does not require a copying device having the both-side print mechanism. Therefore, according to the image formation process shown in FIG. 7, it is possible to configure a copying device to be compact in size.

Although the present invention has been described in considerable detail with reference to certain preferred embodiments thereof, other embodiments are possible.

For example, the above described image formation process according to the embodiment can be applied to various types of image formation devices including a printer, a scanner, and a facsimile device. The imaging process in the print unit 330 is not limited to the electrophotographic process. The print unit 330 may employ various types of imaging processes, such as an inkjet print process.

The image formation device according to the embodiment may be configured to have a color print function or may be a dedicated device for monochrome printing.

In the above described embodiment, the information concerning the detected defective condition of an IC tag is notified to the user through presentation of an error message on the display panel or printing of the error message on an IC tag sheet. However, the detected defective condition may be notified to the user in various ways for identifying the IC tag sheet having the defective IC tag. For example, the copying device may produce a beeping sound when the IC tag sheet having the defective IC tag is ejected. If the copying device has a plurality of paper output trays, the copying device may outputs printed IC tag sheets such that the normal IC tag sheet and the defective IC tag sheet are ejected on different paper output trays.

In the above mentioned embodiment, the defective condition of an IC tag is notified to the user through both of the representation of the error message on the display panel and the printing of the error message on the IC tag sheet. However, the defective condition of an IC tag may be notified to the user through one of the representation of the error message on the display panel and the printing of the error message on the IC tag sheet.

In the above mentioned embodiment, the writing of information to an IC tag and the reading of information from an IC tag are executed through a single unit (i.e., the R/W unit 370). However, the writing of information to an IC tag and the reading of information from an IC tag may be executed through separate units. If the writing of information to an IC tag and the reading of information from an IC tag are executed through the separate units, the unit for writing information to an IC tag may be located on the upstream side of the print unit.

In the above described embodiment, the defective condition of an IC tag is detected through the reading function of the R/W unit 370. However, the defective condition of an IC tag may be detected through a dedicated defect detection unit configured not to access an IC tag. For example, a device, which optically picks up an image of an IC tag and detects a condition of the IC tag to judge whether the IC tag is defective, may be used as the dedicated defect detection unit. In this case, the dedicated defect detection unit may judge that the IC tag is defective if dirt on an IC tag or mechanical deformation of an IC tag is detected from the picked up image of the IC tag.

In the above described embodiment, the defective condition of an IC tag is detected by controlling the R/W unit to compare the information to be written to the IC tag and the information read from the IC tag. However, the defective condition of an IC tag may be detected by reading information from an IC tag without writing information to the IC tag. For example, an image forming device may judge that an IC tag is defective if appropriate information can not be read from the IC tag. More specifically, the image forming device may be configured to have a dedicated reading unit having only the function of reading an IC tag. In this case, predetermined information has been stored in an IC tag in advance, and the image forming device controls the dedicated reading unit to read information from the IC tag after forming an image on an IC tag sheet. The image forming device makes a judgment as to whether the IC tag is defective based on the information read from the IC tag. If the predetermined information is successfully read from the IC tag, the image forming device judges that the IC tag is in the normal state. If the predetermined information is not successfully read from the IC tag, the image forming device judges that the IC tag is defective.

What is claimed is:

1. An image forming device, comprising:
   a print unit configured to form an image on a recording medium in which a memory device is embedded;
   a detection unit configured to detect a condition of the memory device embedded in the recording medium, the detection unit being positioned on a downstream side in a feeding direction with respect to the print unit;
   a processor; and
   a non-transitory computer readable medium storing computer executable instructions that when executed are configured to provide a control unit configured to:
      receive information from the detection unit regarding the condition of the memory device embedded in the recording medium;
      judge whether the memory device embedded in the recording medium is defective based on the information received from the detection unit;
      provide notification concerning the memory device being defective, when the memory device embedded in the recording medium is judged to be defective;
      reverse the recording medium in which the memory device judged to be defective by the control unit is embedded;
      send the recording medium to the print unit again; and
      cause the print unit to print an image indicating defect information of the memory device on a rear side of the recording medium in which the memory device judged to be defective by the control unit is embedded.

2. The image forming device according to claim 1, wherein the control unit is configured to provide notification concerning the condition of the memory device such that a recording medium having the memory device judged to be defective by the control unit is distinguishable from a recording medium having the memory device which is not judged to be defective.

3. The image forming device according to claim 1, wherein the print unit comprises:
   a transfer unit configured to transfer a toner image to the recording medium; and
   a fixing unit configured to fix the toner image transferred to the recording medium by the transfer unit.

4. The image forming device according to claim 1, wherein the detection unit is configured to receive information from the memory device by wireless communication and transmit that information to the control unit and the control unit is configured to judge whether the memory device is defective based on the information received from the memory device.

5. The image forming device according to claim 4, wherein the detection unit is configured to write information to the memory device embedded in the recording medium.

6. The image forming device according to claim 1, wherein the control unit is configured to form an image indicating defect information of the memory device on a recording medium which is a succeeding recording medium with respect to the recording medium in which the memory device judged to be defective by the control unit is embedded.

7. The image forming device according to claim 1, wherein the control unit is configured to form an image which is identical with an image formed on the recording medium in which the memory device judged to be defective by the control unit is embedded, on a recording medium which is a succeeding recording medium with respect to the recording medium in which the memory device judged to be defective by the control unit is embedded.

8. The image forming device according to claim 1, wherein the control unit is configured to control the detection unit to write information which is identical with information to be written to the memory device of the recording medium in which the memory device judged to be defective by the control unit is embedded, to a memory device of a recording medium which is a succeeding recording medium with respect to the recording medium in which the memory device judged to be defective by the control unit is embedded.

9. The image forming device according to claim 1, wherein the control unit is configured such that if the memory device of the recording medium is judged to be defective by the control unit after a rear side of the recording medium is subjected to a print process by the print unit in a both-side print mode, the control unit reverses the recording medium and causes the print unit to print an image indicating defect information of the memory device on a front side of the recording sheet such that the image indicating defect information is overlaid on an image formed on the front side of the recording medium by the print unit.

10. An image forming device, comprising:
a print unit configured to form an image on a recording medium in which a memory device is embedded;
a detection unit configured to detect a condition of the memory device embedded in the recording medium, the detection unit being positioned on a downstream side in a feeding direction with respect to the print unit;
a processor; and
a non-transitory computer readable medium storing computer executable instructions that when executed are configured to provide a control unit configured to:
   receive information from the detection unit regarding the condition of the memory device embedded in the recording medium;
   judge whether the memory device embedded in the recording medium is defective based on the information received from the detection unit;

provide notification concerning the memory device being defective, when the memory device embedded in the recording medium is judged to be defective;

if the memory device of the recording medium is judged to be defective by the control unit after a rear side of the recording medium is subjected to a print process by the print unit in a both-side print mode, reverse the recording medium and cause the print unit to print an image indicating defect information of the memory device on a front side of the recording sheet such that the image indicating defect information is overlaid on an image formed on the front side of the recording medium by the print unit.

* * * * *